United States Patent [19]

Siegel

[11] 4,036,019
[45] July 19, 1977

[54] SOLAR DIFFERENTIAL TEMPERATURE MOTOR

[76] Inventor: Israel Siegel, 351 W. 71 St., New York, N.Y. 10023

[21] Appl. No.: 630,705

[22] Filed: Nov. 10, 1975

[51] Int. Cl.$^2$ .............................................. F03G 7/04
[52] U.S. Cl. ....................................... 60/531; 60/641
[58] Field of Search ................................. 60/508–515, 60/531, 641, 671, 651

[56] References Cited

U.S. PATENT DOCUMENTS

| | | | |
|---|---|---|---|
| 2,907,318 | 10/1959 | Awot | 126/271 |
| 3,778,021 | 12/1973 | Alexander et al. | 60/531 X |
| 3,842,593 | 10/1974 | Bronicki et al. | 60/671 |
| 3,846,984 | 11/1974 | Siegel | 60/531 X |
| 3,910,490 | 10/1975 | Saypalia | 12/271 X |

*Primary Examiner*—Allen M. Ostrager

[57] ABSTRACT

The solar-differential temperature motor consists of a relatively warm evaporator chamber inside a transparent enclosure which is designed to absorb and trap solar energy. The evaporator chamber is paired with a relatively cold condensor chamber shielded from direct solar radiation by non-transparent barriers. The cold chamber is cooled by evaporation of water from its surfaces or by immersion in a relatively cold body of water. Insides of warm and cold chambers are sealed from the outside environment and contain a low boiling point fluid. By closing and opening of a communication between the vapor phases of the chambers cyclic difference in vapor pressures between the chambers is obtained. Pressure differences are translated into motion by means of a movable part of the chambers which responds to changes in pressures in the chambers. A predetermined resistance of the moving part and synchronization of moving part with the opening and closing of communication between the vapor phases provides a cyclic movement of the moving part. By means of proper linkage the movement is translated into useful work. Pump or gravity means are provided for the return of condensed liquid from cold to warm chamber. In one form of the invention the liquid phase of the warm chamber is separated from the vapor phase of the warm chamber during opening of communication between vapor phases of warm and cold chambers.

1 Claim, 3 Drawing Figures

SOLAR DIFFERENTIAL TEMPERATURE MOTOR

BACKGROUND OF THE INVENTION

The invention relates to solar energy and its practical conversion to mechanical and electrical energy. Solar energy is present in unlimited quantities, is renewable, and pollution free. The large scale conversion of solar energy into mechanical and electrical energy has been hindered by the fact that means to accomplish this have required relatively large structures and/or expensive technology. Among the simplest and most practical means for utilization of thermal solar energy are transparent enclosures which trap solar radiation. These enclosures often referred to as greenhouses have been used successfully to increase the temperatures of gardens, water, and homes. A major limitation of the greenhouse means however is the fact that they have not been adapted for practical conversion of solar energy to electrical and mechanical energy. The present invention provides practical means for the utilization of greenhouses technology for the conversion of solar heat into mechanical and electrical energy. This has been accomplished by an improvement in a differential temperature fluid motor recently invented by the author (U.S. Pat. No. 3,846,984).

The differential temperature fluid motor has described a motor containing a low boiling point fluid which operates through a relatively low differential temperatures between two unit chambers. The warm chamber serves as a heat source and the cold chamber serves as a heat sink. According to Carnot's law the efficiency of the motor is limited by the size of the temperature differences between the heat source and the heat sink. It is, therefore, desirable to increase the temperature difference between the warm and cold chambers. This can be achieved, when direct sunlight is available by combining greenhouse means with the warm chamber of the differential temperature motor. Thus, in this invention a transparent chamber is placed around the warm chamber so that it would trap solar radiation and increase the temperature of the warm chamber. While the temperature of the warm chamber is increased the temperature of the cold chamber may be kept relatively low by a combination of means such as non-transparent barriers which minimize the exposure of the cold chamber to direct solar radiation, evaporation of water from the surfaces of the cold chamber, and immersion of the cold chamber in a relatively cold natural body of water. Thus a relatively large temperature differential between the warm and cold chambers of a differential temperature motor may be inexpensively achieved in ambient environments through solar radiation.

The objectives of the present invention are:
1. to trap solar energy and convert thermal solar energy into mechanical and electrical energy through inexpensive greenhouse means and,
2. to increase the temperature differential between the heat source and heat sink of a temperature differential motor and thus increase the Carnot efficiency of the motor.

SUMMARY OF THE INVENTION

The Solar Temperature Differential Motor described in this invention consists of a transparent enclosure adapted to trap and absorb solar energy and transfer heat to a warm chamber situated inside the enclosure. The warm chamber is paired with a relatively cold chamber present outside of the enclosure.

The temperature of the cold chamber is kept lower than that of the warm chamber by several means such as opaque barriers which minimize the exposure of the cold chamber to direct sunlight, evaporation of water from the surfaces of the cold chamber, or by immersion of the cold chamber in a relatively cold body of water.

Both cold and warm chambers are sealed from the outside environment. An activating fluid, preferably one having a low boiling point, is disposed in the respective chambers to define a liquid level to separate the respective chambers into a vapor chamber portion and a liquid chamber portion. The chamber kept at the relatively warmer temperature serves as an evaporator, while the colder chamber functions as a condensor. One or both of the chambers is provided with a moveable portion, with a predetermined resistance to the movement. Adjustable weights or flexible means are provided to synchronize resistance of moving part with a predetermined pressure in the warm chamber. The respective vapor phases and liquid phases of the chambers are connected into communication by connecting conduits. A valve is disposed in the vapor conduit which is rendered responsive to a moveable wall portion of one of the chambers to cycle the changes in pressure occuring within the respective chambers. A one way valve is interposed in the liquid conduit to permit the flow of liquid from the colder chamber to the warmer chamber only.

Cyclical changes in vapor pressure between the two chambers is attained by periodically opening and closing the vapor valve so that the pressure changes occuring in one of the chambers results in the displacement of the moveable wall thereof; the movement of which is translated into work. In the closed position of the vapor valve, pressure within the warm chamber is increased as pressure in the cold chamber is diminished by condensation. The build up pressure within the warm chamber upon overcoming the resistance to movement of the moveable wall portion effects displacement thereof. Upon opening of the vapor valve, the pressure within the warm chamber is diminished and the pressure within the cold chamber increased. The vapor valve being rendered responsive to the displacement of the moveable wall portion effects cyclical changes in pressure which results in periodic displacement of the associated moveable wall portion which is translated into useful work.

In one form of the invention the liquid phase of the warm chamber is separated by a partition containing a valve from the vapor phase of the warm chamber. The valve is operatively associated with the opening and closing of the opening between vapor phases of cold and warm chambers. The valve is open when vapor phases of warm and cold chambers are separated. The valve is closed when communication is established between the vapor phases of the cold and warm chambers.

DETAILED DESCRIPTION

Figure 1:
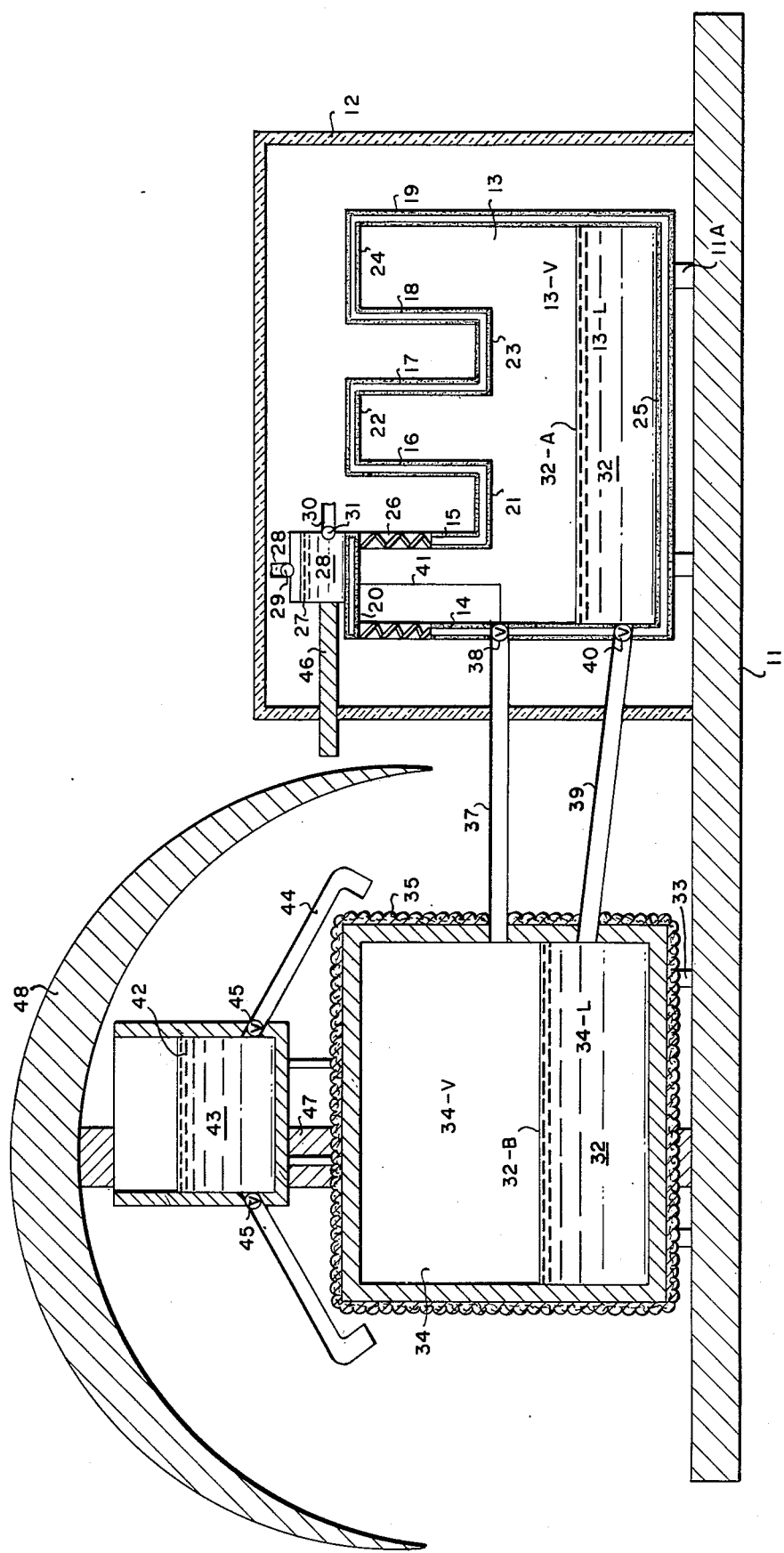
FIG. 1 is a diagrammatical sectional view of a solar temperature differential motor embodying the present invention.

Referring to the drawings there is shown in FIG. 1 a temperature differential motor embodying the present invention. As shown a support or base 11 is provided for supporting thereon a transparent enclosure (e.g. a glass or plastic enclosure) 12. The walls of the said enclosure are designed to allow sunlight to enter freely into the enclosure but to hinder heat from leaving the enclosure. The surfaces of all members present inside of the enclosure may be painted black to aid in the absorption of heat from sun rays entering the enclosure.

Present inside enclosure 11 is a chamber 13 which functions as an evaporator as will be hereinafter described. The chamber 13 is supported by frame 11 and frame extensions 11A. The top chamber 13 is divided into several interconnected parts in order to increase the surface area of the chamber. The chamber 13 is defined by circumscribed side walls 14, 15, 16, 17, 18 and 19, top walls 20, 21, 22, 23, and 24 and bottom wall 25. The top wall 20 is connected to the circumscribing side walls 14 and 15 by means of a compressable and/or expandable bellows joint 26. The arrangement is such that the top wall 20 can be readily moved within the limits of the expansion and contractions of the bellows joint 26 in a reciprocating up and down direction. Present on top of top wall 20 is container 27 whose sole function is to provide weight and so provide resistance to the upper movement of wall 20 as will be hereinafter described. Present inside container 27 is a material such as water 28 which increases the weight of container 27. The amount of water 28 in container 27 may be adjusted to provide a predetermined resistance to the upperward movement of top wall 20. For that purpose water may be transferred into container 27 through inlet 28 and valve 29 present on top of container 27, and water may be removed from container 27 through pipe 30 and valve 31. Disposed within the vaporator or chamber 13 is a supply of activating liquid 32, which is a liquid having a low boiling point. The activating liquid 32 thus defines a liquid level 32A to separate chamber 13 into liquid chamber portion 13L and a vapor chamber portion 13V.

Suitable supported on a frame structure 11 and frame extension 33 is another chamber 34 which functions as a condensor as will be hereinafter described. In this form of the invention the external surfaces of the condensor chamber 34 is covered by a wick like material 35 which when wetted with a suitable liquid, e.g. water, effects the cooling of the condensor chamber 34 by evaporation, as will be hereinafter described. Chamber or condensor 34 contains a supply of activating fluid 32 wherein the liquid level 32B thereof defines a chamber liquid portion 34L and a chamber vapor portion 34V. Connecting the vapor chamber 34V of the condensor chamber 34 to the vapor chamber portion 13V of the evaporator chamber 13 is a connecting conduit 37. A valve means 38 is interposed in conduit 37 to control the opening and closing of conduit 37, and thus control the flow of vapor between evaporator 13 and condensor 34. Connecting the liquid chamber portion 13 of the evaporator chamber 13 to the liquid portion 34L of evaporator chamber 34 is a connecting conduit 39. A valve means 40 is interposed in conduit 39 to regulate the flow of liquid 36 between the respective liquid chamber portions 34L and 13L of chambers 34 and 13. The valve 40 is constructed to allow for only one way movement of the liquid, i.e. the liquid 32 is free to move from the liquid chamber portion of 34L of the condensor chamber 34 to the liquid portion 13L of the evaporator chamber 13. The valve 40 prohibits any reverse movement of fluid 34 and 32 from the liquid portion 13L to the liquid portion 34L.

In accordance with this invention, the vapor valve 38 is periodically actuated between an open and closed position automatically and in response to the movement of top wall 20 of the evaporator chamber 13 as will be herein described. A valve actuator 41 is interconnected between top wall 20 of evaporator chamber 13 and the valve 38. The arrangement is such that top wall 20 of chamber 13 travels upward when the vapor pressure in evaporator chamber 13 reaches a predetermined level as will be hereinafter described. When top wall 20 of chamber 13 reaches its upper limit of travel valve extension 41 will effect an opening of valve 38. Downward movement of upper wall 20 will effect a closing of valve 38.

Supported on top of the condensing chamber 34 is a reservoir or tank 42 which is adapted to contain a supply of cooling liquid 43 such as water. Branch conduits 44 connected to the tank or reservoir 42 for directing the cooling water 43 from the tank or reservoir 42 onto the outer wick coating 35 of the condensor chamber 34. If desired, suitable valve means 45 may be interposed in the respective branch conduits 44 for controlling the flow of cooling water onto the wick coating 35.

Connected to the upper wall 20 of chamber 13 is a force transmitting member 46. The extended end of the transmitting member 46, it will be understood, is connected through mechanical means or linkages so that the movement of the upper wall 20 can be translated into useful work. The chambers 34 and 13, while interconnected between themselves, are sealed off from the outside atmosphere so as to prevent any loss of the activating fluid 32.

Suitably supported on column 47 is a solar shield 48 made of nontransparent material, e.g. wood. In the illustrated form of the invention the solar shield is in the form of an umbrella which is adapted to shield condensor chamber 34 from the rays of the sun and thus minimize the heating effects of said rays.

The operation of the differential motor described in FIG. 1 is as follows: During a sunny or hazey day, solar rays enter transparent enclosure 12 and increase the temperature of the inside of enclosure 12 and of evaporator 13 to above ambient temperature. In contrast, solar rays are prevented from reaching condensor chamber 34 by solar shield 48. With valves 45 open, water is withdrawn from the reservoir tank 42, e.g. by gravity and drips onto the wick surface 35 to wet the same. The natural evaporation of the water from the wick surface 35 effects a cooling of the chamber 34 to several degrees below ambient temperature. The heating of evaporator chamber 13 by solar energy trapped in enclosure 12 and the cooling of condensor chamber 34 by evaporating water results in a temperature differential between chambers 13 and 34. With valve 38 in its closed position, the vapor portion 13 V of chamber 13 is separated from the vapor portion chamber 34 V of chamber 34. As the activating fluid 32 has a low boiling point it will volutize within chambers 13 and 34, creating a vapor pressure within the respective chambers. Because the temperature in chamber 13 is higher than the temperature in chamber 34 the vapor pressure in chamber 13 will be larger than the vapor pressure in chamber 34. The increasing vapor pressure in chamber 13 exerts a force upon moveable wall 20 of chamber 13. When the vapor pressure acting on the top wall 20 of chamber 13 exceeds the resistance to movement exerted by weight of container 27 upon bellows joint 26, the top wall 20 will move upwards in response to this excessive vapor pressure. Upon upward movement of the top wall 20 and when top wall 20 has reached its upper limit of travel valve actuator 41 is displaced, accordingly, to cause valve 38 to open the communication between the respective vapor chamber portions 13 V and 34 V of chamber 13 and 34, respectively. In doing so vapor enters chamber 34 from chamber 13 and vapor pressure in chamber 13 is reduced. The force of gravity of weight of container 27 is regulated so that it will cause the bellows 14 to contract and move downward when vapor pressure in chamber 13 is reduced by the opening of valve 38. Upon the downward movement of the top wall 20 of chamber 13, and as the top wall 20 approaches its lower limit of travel, the valve actuator 41 will cause the closing of valve 38. The vapor which has entered into container 34 from container 13 will, due to the colder temperature of container 34, subsequently condense to return to its liquid form. This will result in a reduction of the vapor pressure in container 34. Conversely the vapor pressure in the relatively warm chamber 13 is regenerated by the evaporation of the activating fluid 32. When the pressure in chamber 13 reaches a predetermined unit it overcomes the resistance of weight of container 27 and causes top wall 20 upward to renew the cycle of operation.

The excess of liquid 32, which is condensed in chamber 34, is redirected to chamber 13 through the liquid conduit 39 and the one way valve 40, controlling the flow therethrough.

In a complete cycle of operation the movement of the top wall 20 of evaporator chamber 13 will effect a corresponding movement of the transmission member 46. The reciprocating movement of the transmission member 46 through the appropriate mechanical linkages is readily translated into either a rotary or linear motion which is capable of being translated into work. Thus the movement of transmission member 46 may cause the movement in a generator to produce electricity, or may be utilized to compress a vapor in a refrigeration or air conditioning unit.

While the temperature of condensor chamber 34 is illustrated to be kept below that of evaporator 13 by both a solar non-transparent shield and evaporation of water from the surfaces of the condensor 34, it will be understood that solar shielding along or evaporation of water alone may keep the condensor chamber cooler than the evaporating chamber. Additional means such as a fan to circulate air around the cold condensor chamber may likewise be utilized to increase the rate of water evaportion and thus increase the cooling effects of said evaporation.

While moving member has been illustrated as top wall 20, it is understood that any other part in the evaporator condenser chambers may, likewise, be made moveable, and made to respond to changes of pressures in the chambers which occurs upon the opening and closing of conduit between the vapor phases of the chambers.

It is likewise understood that the resistance to moving part may be achieved not only through weight on top of moving part, but also be flexible means such as springs.

Figure 2:
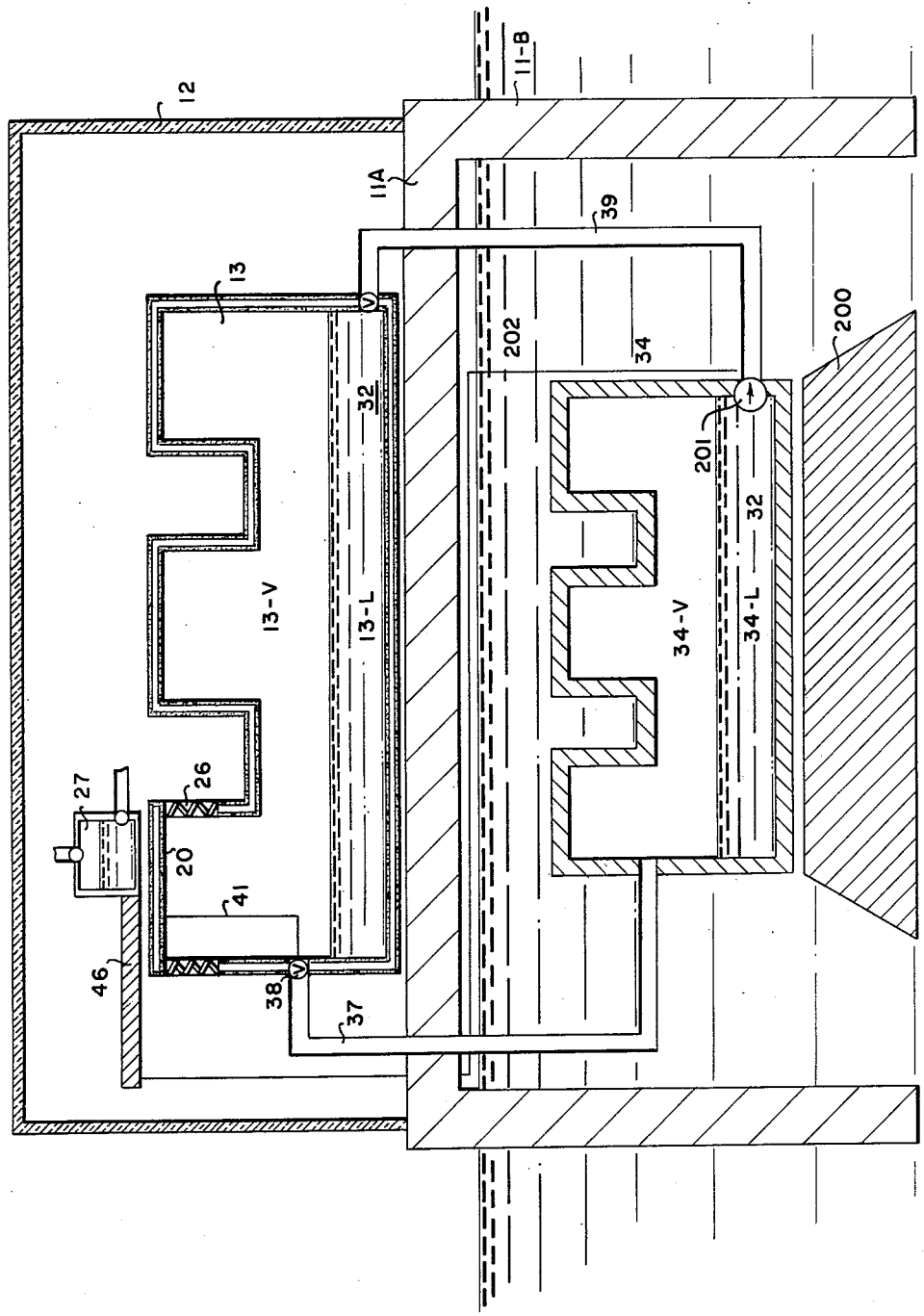
FIG. 2 is a diagrammatical sectional view of a modified form of a solar temperature differential motor.

FIG. 2 illustrates another form of the invention which is adapted to operate through a temperature differential between a warm chamber in a transparent enclosure which traps solar energy and a cold chamber which is cooled by immersion in a relatively cold body of water. This embodiment is particularly adapted for use in the proximity of a large body of water W as for example, a lake or ocean. This version can be likewise utilized on a boat traveling through such a body of water W.

As shown, a platform 11A is built at the water-atmosphere interface of a body of water. Columns 11B suitably support platform 11A. On top of platform 11A there is the transparent enclosure 12 and inside the transparent enclosure there is present the evaporator or warm chamber 13. In this form of the invention the evaporator chamber 13 is identical with evaporator chamber 13 described in FIG. 1. The cold chamber 34 has however been modified to be submerged in a body of water as follows: The cold or condensor chamber 34 is submerged in a body of water W and rests on platform 200. The wick covering 35 of FIG. 1 as hereinbefore described is omitted. In the embodiment of FIG. 2 a pump 201 is disposed in the liquid conduit 39 to pump the condensate in liquid portion 34L of the condensor chamber 34 to the liquid chamber portion 13L of the evaporator chamber 13. If desired, the pump 201 may be activated by the movement of force receiving means 46 of the evaporator chamber 13 through a suitable interconnecting linkage means 202. A pressure or one way valve 40 is disposed in conduit 39 to open in response to the outside pressure of the pump, but not in response to the vapor pressure occurring in evaporator chamber 13.

The operation of the differential temperature motor of FIG. 2 is as follows:

Solar rays enter enclosure 12 and solar thermal energy accumulates inside the enclosure 12. This raises the temperature inside enclosure 12 and evaporator chamber 13 above ambient temperature. In contrast the immersion of the condensor chamber 34 in the relatively cold body of water lowers the temperature of the condensor chamber to below ambient atmospheric temperature. This results in a temperature differential between the evaporator chamber 13 and the condenser chamber 34. With valve 38 in its closed position the vapor portion 13 V of chamber 13 is separated from the vapor portion 34 V of chamber 34. As the activating fluid 32 has a low boiling point, it will volutize within chamber 13 and 34, creating a vapor pressure within the respective chambers. Because the temperature in chamber 13 is higher than the temperature in chamber 34 the vapor pressure in chamber 13 will be larger than the vapor pressure in chamber 34. The increasing vapor pressure in chamber 13 exerts a force upon moveable wall 20 of chamber 13. When the vapor pressure acting on the top wall 20 of chamber 13 exceeds the resistance to movement exerted by weight of container 27 upon bellows joint 26, the top wall 20 will move upwards in response to this excessive vapor pressure. Upon upward movement of the top wall 20 and when top wall 20 reached its limit of travel valve actuator 41 is displaced, accordingly, to cause valve 38 to open the communication between the respective vapor chamber portions 13 V and 34V of chambers 13 and 34, respectively. In doing so vapor enters chamber 34 from chamber 13 and vapor pressure in chamber 13 is reduced. The force of gravity of weight of container 27 is regulated so that it will cause the bellows 14 to contract and move downward when vapor pressure in chamber 13 is reduced by the opening of valve 38. Upon the downward movement of the top wall 20 of chamber 13 and as the top wall 20 approaches its lower limit of travel, the valve actuator 41 will cause the closing of valve 38. The vapor which has entered into container 34 from container 13 due to the relatively colder temperature of container 34 will subsequently condense to return to its liquid form. This will result in a reduction of the vapor pressure in container 34. Conversely the vapor pressure in the realatively warm chamber 13 is regenerated by the evaporation of the activating fluid 32. When the pressure in chamber 13 reaches a predetermined limit it overcomes the resistance of weight of container 42 and causes top wall 20 upward to renew the cycle of operation.

The excess of liquid 32 which is condensed in chamnber 34 is pumped back to chamber 13 by means of pump 201 through the liquid conduit 39 and one way valve 40, controlling the flow therethrough.

In a complete cycle of operation the movement of the top wall 20 of evaporator chamber 13 will effect corresponding movement of the transmission member 46. The reciprocating movement of the transmission member 46 through the appropriate mechanical linkages is readily translated into either a rotary or linear motion which is capable of being translated into work. Thus, the movement of transmission member 44 may cause the movement in a generator to produce electricity or may be utilized to compress a vapor in a refrigeration or air conditioning unit.

It is understood that in days when atmospheric temperature is warmer than water temperature, a temperature differential between evaporator and condensor chamber can be obtained without the transparent enclosure 12. Removable panels, windows, or doors may be part of enclosure 12 to effect an opening of the enclosure 12 when direct solar energy is not available.

Figure 3:
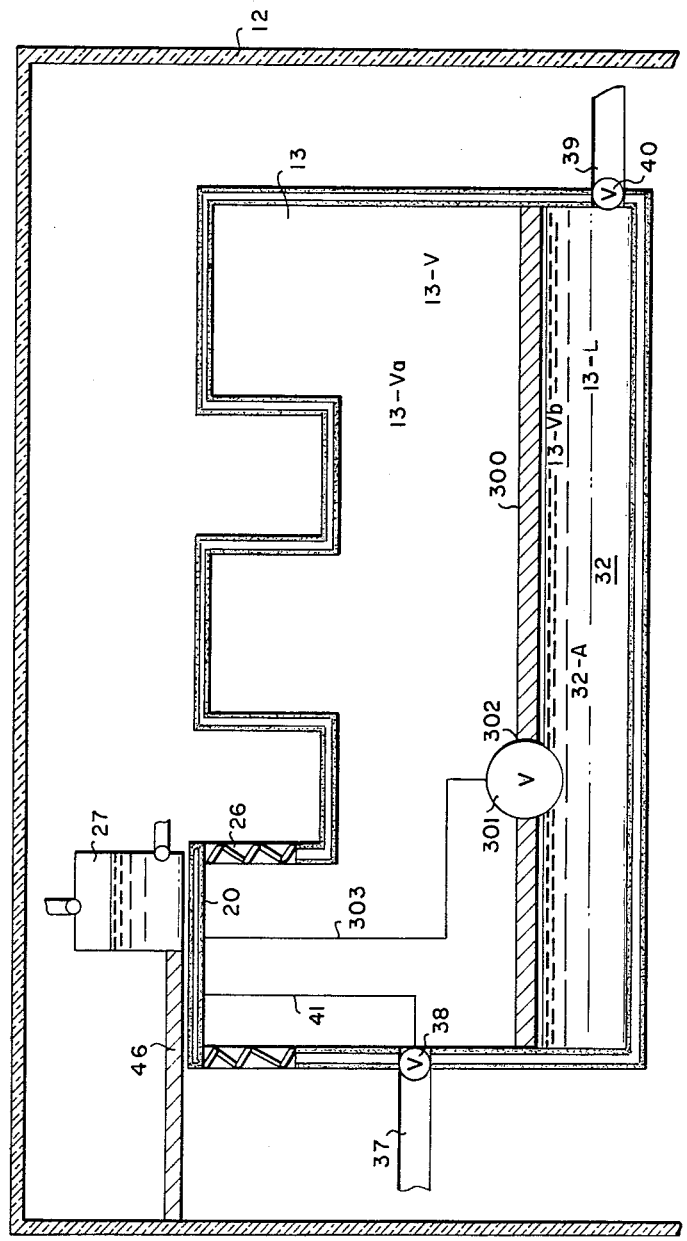
FIG. 3 is a diagrammatical sectional view of a modified form of the warm chamber of a solar temperature differential motor.

FIG. 3 illustrates a modified evaporator chamber 13. The evaporator chamber 13 described in FIG. 3 is similar in all respects to the evaporator chambers 13 described in FIG. 1 and FIG. 2 but contains the following additions. A partition 300 is present above the liquid level 32A of chamber 13 and divides the vapor porion 13V of chamber 13 into two parts. The partition 300 is placed at a close proximity to liquid level 32A so that most of vapor phase 13 V$a$ is present above partition 300, and only a relatively small portion 13 V$b$ of vapor phase is present below partition 300. Valve 301 is present in partition 300 and controls an opening 302 between vapor phases 13 V$b$ and 13 V$a$. Valve 301 is connected to moveable top wall 20 through valve actuator 303. The arrangement is such that when top wall 20 closes valve 38 it opens valve 301 and when top wall 20 opens valve 38 it closes valve 301. The evaporator chamber 13 may be coupled with a condensor chamber (not shown) of a type described in either FIG. 1 or FIG. 2.

The operation of the warm chamber 13 when coupled with a cold chamber is as follows: Solar rays enter enclosure 12 and raise the temperature of warm chamber 13 above ambient temperature. This causes excess vapor to be formed in chamber 13 from the low boiling point fluid 32. With valve 301 open, the vapor formed in chamber vapor poriton 13 V$b$ enters freely into chamber vapor portion 13 V$a$ through the opening 302. With valve 38 closed vapor accumulates in chamber portion 13 V$a$ and exerts a pressure upon moveable wall 20. When the vapor pressure acting on the top wall 20 of chamber 13 exceeds the resistance exerted by weight of container 27 the top wall 20 will move upward. Upon upward movement of the top wall 20 and when wall 20 reaches its uppermost limit of travel valves actuators 41 and 303 are displaced. The displacement of actuator 41 opens valve 38 and the displacement of actuator 303 closes valve 301. The closing of valve 301 prevents the entrance of vapor from chamber vapor portion 13 V$b$ to vapor chamber 13 V$a$. The opening of valve 38 allows vapor in chamber 13 V$a$ to leave chamber vapor portion 13 V$a$ through pipe 37 and enter a coupled cold chamber. Newly formed vapor in chamber portion 13 V$b$ cannot enter chamber portion 13 V$a$ because of barrier 300 and closed valve 301. Vapor pressure exerted on moving wall 20 is thus reduced to the level of pressure in the coupled condensor chamber. The weight of container 27 is regulated to force top wall 20 to move downward when vapor pressure in chamber vapor portion 13 V$a$ is reduced by opening of valve 38. Upon the downward movement of the top wall 20, and as the wall 20 reaches its lower limit of travel, the valve actuator 41 will close valve 38, and valve actuator 303 will open valve 301. The opening of valve 301 allows the vapor from chamber portion 13 V$b$ to enter the chamber vapor portion 13 V$a$. Since valve 38 is closed the vapor entering chamber portion 13 V$a$ will again exert a pressure on top wall 20 to renew the cycle of operation. The condensation of vapor in the coupled cold chamber and the return of the condensate to warm chamber through conduit 39 are identical with those disclosed in FIG. 1 and FIG. 2.

While the invention has been described with reference to the embodiment thereof in FIGS. 1–3, it will be readily understood that variations and modifications of the invention may be made without departing from the spirit or scope of the invention as will be readily seen in the claims.

What is claimed is:

1. A power producing unit consisting of a chamber containing an evaporating fluid dividing said chamber into a liquid chamber portion and a vapor chamber portion, a moving part responding to vapor pressure changes in the chamber, an outlet to allow the exit of vapor from said chamber, means to allow opening and closing of said outlet to cause vapor pressure changes in said chamber, said means operatively associated with said moving part, an inlet to allow entrance of liquid into said chamber, a partition dividing said liquid chamber portion from said vapor liquid portion, means to open and close said partition, said means operatively associated with said moving part, and means for translating movement of said moving part into useful work.

* * * * *